United States Patent
Teyeb et al.

(10) Patent No.: US 9,871,723 B2
(45) Date of Patent: Jan. 16, 2018

(54) METHOD AND DEVICE FOR HANDLING MULTI PATH CONNECTIONS

(71) Applicant: Telefonaktiebolaget L M Ericsson (publ), Stockholm (SE)

(72) Inventors: Oumer Teyeb, Solna (SE); Niklas Johansson, Sollentuna (SE); Christofer Lindheimer, Linköping (SE); Patrik Rugeland, Stockholm (SE); Magnus Stattin, Sollentuna (SE); Jari Vikberg, Järna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 129 days.

(21) Appl. No.: 14/428,417

(22) PCT Filed: Feb. 9, 2015

(86) PCT No.: PCT/SE2015/050147
§ 371 (c)(1),
(2) Date: Mar. 16, 2015

(87) PCT Pub. No.: WO2016/130054
PCT Pub. Date: Aug. 18, 2016

(65) Prior Publication Data
US 2016/0373339 A1    Dec. 22, 2016

(51) Int. Cl.
*H04L 12/707* (2013.01)
*H04W 40/12* (2009.01)
(Continued)

(52) U.S. Cl.
CPC .............. *H04L 45/22* (2013.01); *H04L 45/24* (2013.01); *H04W 40/12* (2013.01); *H04W 40/34* (2013.01);
(Continued)

(58) Field of Classification Search
None
See application file for complete search history.

(56) References Cited

U.S. PATENT DOCUMENTS 8,520,577 B1 *  8/2013  Pankajakshan ... H04W 36/0055
                                             370/310
8,780,693 B2 *  7/2014  Kim ........................ G06F 15/16
                                             370/216
(Continued)

FOREIGN PATENT DOCUMENTS

EP    2624509 A2    8/2013

OTHER PUBLICATIONS

Ford, A. et al., "TCP Extensions for Multipath Operation with Multiple Addresses", IETF, RFC 6824, Jan. 2013, 1-53.
(Continued)

*Primary Examiner* — Tejis Daya
(74) *Attorney, Agent, or Firm* — Murphy, Bilak & Homiller, PLLC

(57) ABSTRACT

There is provided method and devices for handling multi path routing of data packets. The method comprises the step S1 of establishing a multi path connection with a target network node, the multi path connection comprising a plurality of paths over which data packets can be transmitted to the target network node. The method also comprises the step S2 of obtaining information relating to the quality of the plurality of paths and the step S3 of determining, based on the obtained information, whether a path in the plurality of paths has been disconnected or is about to be disconnected. The method also comprises the step S4 of activating at least one substitution path if it is determined that a path in the plurality of paths have been disconnected or is about to be disconnected, to enable transmission of data packets intended to be transmitted on the disconnected path, or the path about to be disconnected, over the activated substitu-
(Continued)

tion path. Corresponding devices and computer programs enabling handling of multi path connections are also provided.

21 Claims, 13 Drawing Sheets

(51) Int. Cl.
 *H04W 40/34* (2009.01)
 *H04L 12/703* (2013.01)
 *H04W 84/04* (2009.01)
 *H04W 84/12* (2009.01)

(52) U.S. Cl.
 CPC .......... *H04L 45/28* (2013.01); *H04W 84/042* (2013.01); *H04W 84/12* (2013.01)

(56) References Cited

U.S. PATENT DOCUMENTS

| | | | | |
|---|---|---|---|---|
| 9,456,464 | B2* | 9/2016 | Biswas | H04L 45/24 |
| 2002/0102941 | A1* | 8/2002 | Kuiri | H04W 36/20 |
| | | | | 455/67.11 |
| 2004/0192221 | A1* | 9/2004 | Matsunaga | H04W 36/30 |
| | | | | 455/76 |
| 2005/0185632 | A1 | 8/2005 | Draves, Jr. et al. | |
| 2011/0007652 | A1* | 1/2011 | Bai | H04L 12/5695 |
| | | | | 370/252 |
| 2012/0144062 | A1* | 6/2012 | Livet | H04L 45/24 |
| | | | | 709/239 |
| 2013/0077501 | A1* | 3/2013 | Krishnaswamy | H04L 47/193 |
| | | | | 370/252 |
| 2013/0195106 | A1* | 8/2013 | Calmon | H04B 7/15521 |
| | | | | 370/389 |
| 2013/0279331 | A1* | 10/2013 | Pluntke | H04L 45/24 |
| | | | | 370/230 |
| 2014/0161437 | A1* | 6/2014 | Miyabe | H04B 10/032 |
| | | | | 398/5 |
| 2015/0063093 | A1* | 3/2015 | Vasseur | H04J 3/14 |
| | | | | 370/217 |
| 2016/0205586 | A1* | 7/2016 | Kim | H04L 1/1607 |
| | | | | 370/230 |
| 2016/0212759 | A1* | 7/2016 | Schliwa-Bertling | H04L 69/14 |

OTHER PUBLICATIONS

Paasch, Christoph et al., "Exploring Mobile/WiFi Handover with Multipath TCP", Cellular Networks: Operations, Challenges, and Future Design, Helsinki, Finland, Aug. 13, 2012, 31-36.

\* cited by examiner

METHOD AND DEVICE FOR HANDLING MULTI PATH CONNECTIONS

TECHNICAL FIELD

The proposed technology generally relates to a method performed by a network node for handling Multi Path connections and a corresponding network node and corresponding computer programs and computer program products.

BACKGROUND

In order to increase the resource usage and redundancy within network systems, multi path connections have been introduced as a way to provide network nodes with the possibility to communicate, that is, transmit and receive data, with other network nodes over several communication paths. The communication paths may constitute connections over different interfaces or Radio Access Technologies, RATs, such as one path over a 3GPP network and another path over a non-3GPP network such as for example Wi-Fi. The provision of multiple paths connecting different network nodes enables the network nodes to simultaneously transmit data packets over several paths. This in turn enables the network nodes to distribute the load on all interfaces connecting the nodes and also to perform congestion control separately for the different interfaces used.

A particular example of a multi path connection is provided by the Multi-Path Transmission Control Protocol, MPTCP. The main principle of MPTCP is to aggregate a set of TCP connections over, for example, different wireless interfaces such as 3GPP and Wi-Fi. It may also aggregate a set of TCP connections over different but simultaneous 3GPP accesses. MPTCP can be described as having one main flow and multiple subflows. Network nodes that are MPTCP enabled and have established an MPTCP connection can therefor communicate over several interfaces simultaneously. This leads to faster communication between the nodes and as such provides for a more satisfied end user.

Other benefits of MPTCP are that:
  It allows a single data-connection to use several interfaces simultaneously increasing the throughput.
  It allows fallover from one interface to another, e.g. in the case of mobile client moving between 3GPP and Wi-Fi
  It increases the bandwidth due to resource pooling.
  It is backward compatible i.e. it falls back to TCP as needed.
  It is transparent to applications. i.e., the applications benefit from MPTCP without any code changes as they use a standard socket API.

Notwithstanding the obvious positive aspects provided by multi path connections the relative complexity of the technology, displaying several connections instead of a single connection, make the system slightly vulnerable. The technology is in particular sensitive to scenarios where links or connections begin to malfunction or are disabled/disconnected. If a certain connection malfunctions or gets disconnected, the data intended to be transmitted on the connection may not reach the intended recipient while other data transmitted over other paths in the multi path transmission will. A particular way to address this is to retransmit the data packets that were intended to be transmitted on the malfunctioning path over some of the remaining paths. This however leads to the head of line blocking problem where the data packets to be retransmitted are positioned last in the data transmission buffer of the remaining path. Hence the data packets will be retransmitted after the data packets allocated to the remaining path have been transmitted. This will in turn lead to the unwanted feature of bursty transmissions.

SUMMARY

It is an overall object to provide a mechanism whereby a more robust and reliable transmission of data packets over multi path connections can be achieved. It is in particular an object to reduce the negative impact of head of line blocking in multi path transmissions, in particular MPTCP transmissions. The proposed mechanisms provides an effective counter to problems such as bursty transmissions. This will in turn improve the possibilities to achieve more seamless transmissions and thus improve the experience in for example data streaming applications.

This and other objects are met by embodiments of the proposed technology.

According to a first aspect, there is provided a method performed by a network node for handling multi path routing of data packets. The method comprises the step of establishing a multi path connection with a target network node, the multi path connection comprising a plurality of paths over which data packets can be transmitted to the target network node. The method also comprises the step of obtaining information relating to the quality of the plurality of paths. The method also comprises the step of determining, based on the obtained information, whether a path in the plurality of paths has been disconnected or is about to be disconnected. The method also comprises the step of activating at least one substitution path if it is determined that a path in the plurality of paths have been disconnected or is about to be disconnected, to enable transmission of data packets intended to be transmitted on the disconnected path, or the path about to be disconnected, over the activated substitution path.

According to a second aspect there is provided a network node configured to handle multi path routing of data wherein the network node is configured to establish a multi path connection with a target network node, the multi path connection comprising a plurality of paths over which data packets are transmitted to the target network node. The network node is also configured to obtain information relating to the quality of the plurality of paths. The network node is also configured to determine, based on the obtained information, whether a path in the plurality of paths has been disconnected or is about to be disconnected. The network node is further configured to activate the substitution path if it is determined that a path in the plurality of paths have been disconnected or is about to be disconnected to enable data packets intended to be transmitted on the disconnected path to be transmitted on the substitution path.

According to a third aspect there is provided a computer program that enables a substitution path to be set up and activated. The computer program comprising instructions, which when executed by at least one processor, cause the at least one processor to:
  read information relating to the quality of a plurality of paths comprised in a multi path connection, and
  determine, based on the read information, whether a path in the plurality of paths has been disconnected or is about to be disconnected, and
  output instructions that at least one substitution path should be activated if it is determined that a path in the plurality of paths have been disconnected or is about to be disconnected, to thereby enable transmission of data packets intended to be transmitted on the disconnected path, or the path about to be disconnected, over the activated substitution path.

According to a fourth aspect there is provided a computer program product comprising a computer program according to the third aspect.

Other embodiments and corresponding advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
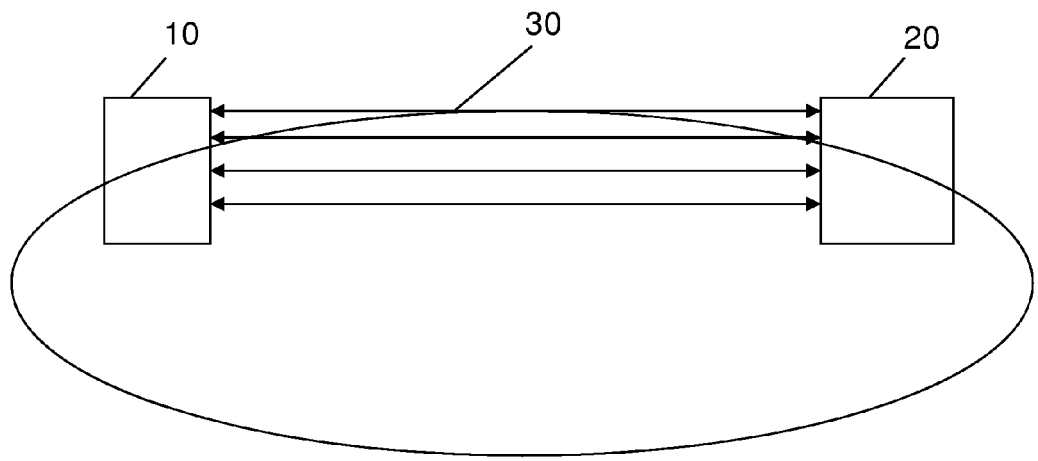
FIG. 1 is a schematic illustration of a couple of network nodes communicating through multi path connections.

For a better understanding of the proposed technology, it may be useful to begin with a brief overview of the principles of multi path connections. This will later be exemplified by means of a description of Multi-Path TCP, MPTCP. It is however possible to utilize the proposed technology in other multi-path connection schemes where network nodes communicate, i.e. transmits data between each other, over several paths not necessarily belonging to the same Radio Access Technology. It is for example possible to provide a subset of the paths linking the two network nodes to a first RAT, such as a 3GPP network and some other subset of the paths to a non-3GPP network such as WLAN. FIG. 1 provides an illustration where a network node 10 communicates with a target network node 20 by means of multi path connections 30.

Most of the multi path connection schemes suffers from some inadequacies relating to head of line blocking. That is, when one or more of the paths linking the network nodes gets disconnected or begin to malfunction, data packets intended to be transmitted on these path(s) will not reach the intended recipient. In order to provide the recipient with the data packets the transmitting network node needs to retransmit the data packets over the path that is still working. This path is however busy transmitting the data packets that were initially allocated to the path. The data packets that needs to be retransmitted will therefore end up at the end of the transmission buffer of the working path and will therefore be retransmitted at a later time. This scenario is referred to as head of line blocking for multi path connections.

In order to mitigate the drawbacks relating to head of line blocking the inventors have found a mechanism whereby the data packets that needs to be retransmitted can be retransmitted much earlier. This will ensure more robust and smooth transmissions.

The proposed technology provides a method performed by a network node for handling multi path routing of data packets. The method comprises the step of establishing S1 a multi path connection with a target network node, the multi path connection comprising a plurality of paths over which data packets can be transmitted to the target network node. The method also comprises the step of obtaining S2 information relating to the quality of the plurality of paths. The method further comprises the step of determining S3, based on the obtained information, whether a path in the plurality of paths has been disconnected or is about to be disconnected. The method also comprises the step of activating S4 at least one substitution path if it is determined that a path in the plurality of paths have been disconnected or is about to be disconnected, to enable transmission of data packets intended to be transmitted on the disconnected path, or the path about to be disconnected, over the activated substitution path.

Figure 2:
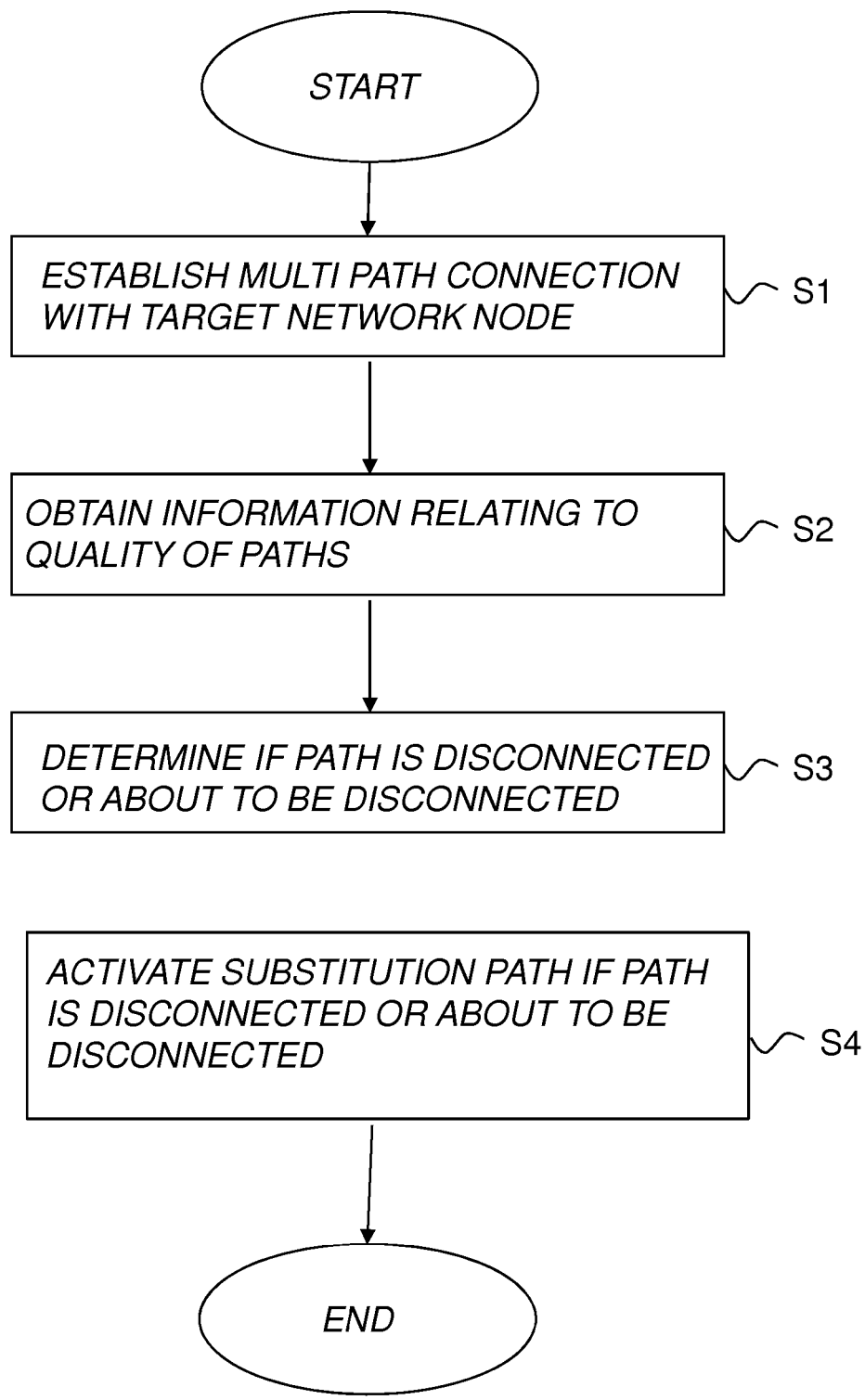
FIG. 2 is a schematic flow diagram illustrating a particular embodiment of a method for handling multi path connections.

In slightly different wording, the proposed technology provides a method whereby a network node establishes multi path connections with a target network node to enable data packets to be transmitted between the network node and the target network node simultaneously over several distinct paths. The method also obtains information about the status or the quality of the various paths used in the multi path connection. This information is used to determine whether any of the paths in the established set of paths is malfunctioning in any way such as being disconnected or about to be disconnected. If the method determines that some path has been disconnected, for example, then the method proceeds to activate a substitution path taking the place of the malfunctioning path. By ascertaining that there is a substitution path that can be activated upon need, the method provides a way whereby the data packets intended to be transmitted on the disconnected or malfunctioning path can be transmitted on the substitution path instead of being directed to the buffer of some initially established path. This will ensure that the data packets will be transmitted as fast as possible over the substitution path and that outstanding packets from the disconnected path can be transmitted on the substitution path. The problem of head of line blocking is therefore countered. This will in turn provide robust transmissions where burstiness, i.e. increases and decreases in transmission activity, is reduced. This will in turn lead to improved user experience, especially in cases of interactive/streaming applications where burstiness can have high impacts on perceived QoS. The method is schematically illustrated in the flow diagram of FIG. 2.

The multi path routing of the method is, according to a particular embodiment of the proposed technology, performed by means of a Multiple Path Transmission Control Protocol, MPTCP. It is therefore provided a mechanism whereby all positive features of the MPTCP can be maintained while the problem with head of line blocking, to which the MPTCP scheme is vulnerable, is mitigated.

According to another embodiment of the proposed technology, the step S1 of establishing an MPTCP connection comprises to establish an MPTCP connection comprising a plurality of paths where the plurality of paths comprises two paths. By way of example, the first path may be over a first Radio Access Technology and the second path may be over a second Radio Access Technology.

The establishing step S1 therefore establishes the initial paths to be used in the multi path connection. The initially established paths are used to transmit the data packets between the network node and the target network node. The number of paths used may vary but each of the initially established paths should preferably be used actively for transmission of data. The substitution path is activated as a response to a scenario where any of the initially established, and actively used, paths are determined to be disconnected or about to be disconnected.

The first Radio Access Technology may in a particular example be a 3 GPP network while the second Radio Access Technology may be a non-3GPP network. The second Radio Access Technology may for example comprise a Wireless Local Area Network, WLAN.

The at least one substitution path may, in a particular embodiment of the method, be set up during the step of establishing the multi path connection with the target network node. That is, when the network node and the target network node establishes the set of paths to be used in multi path transmissions, they may also set up the particular substitution path to be used in case one of the established paths gets disconnected or is about to be disconnected. This embodiment provides a mechanism where the retransmission of data packets can be initiated as soon as there are indications that a particular path, or particular paths, are malfunctioning.

An alternative embodiment provides a method wherein the at least one substitution path is set up when it has been determined that a path in the plurality of paths has been disconnected or is about to be disconnected. That is, the substitution path(s) is/are set up when a path or several paths have been determined to be disconnected or about to be disconnected. This embodiment provides a certain flexibility when it comes to choosing the RAT over which the substitution path is chosen. It enables the network nodes to choose the RAT most suitable at the particular time point when the paths are disconnected or about to be disconnected.

In still another embodiment of the proposed technology there is provided a method that further comprises to set up substitution paths over all Radio Access Technologies utilized in the established multi path connection. In other words, substitution paths are set up for all RATs over which a set of paths has been established. Assume for example that the initially established multi path connection comprises paths over several different RATs, such as one path over a first RAT, a second path over a second RAT, etc, substitution paths may then be set up for all of the different RATs present in the initially established connection. That is a substitution path for the first RAT, a substitution path for the second RAT and so forth. As an example, if the plurality of paths established comprises paths over a 3GPP network and a Wi-Fi network then substitution paths are set up that comprises paths over the 3GPP network as well as the Wi-Fi.

A particular embodiment of the proposed technology provides a method wherein the step S4 of activating a substitution path comprises to activate a substitution path over a Radio Access Technology that is different from the Radio Access Technology of the path determined to be disconnected or about to be disconnected. That is, if a path over for example Wi-Fi is disconnected the present embodiment of a method activates a substitution path that is over a different RAT than Wi-Fi. It may for example be a substitution path over a 3GPP technology.

Yet another particular embodiment of the proposed technology provides a method wherein the step S4 of activating a substitution path comprises to activate a substitution path over a Radio Access Technology that is the same as the Radio Access Technology of the path determined to be disconnected or about to be disconnected but on a different frequency than the initially established path. In this way it will be possible to use the same RAT as the RAT over which the disconnected path was defined but the substitution path is associated with a different frequency than the frequency of the initially established path.

According to an exemplary embodiment of the proposed technology there is provided a method wherein the step S2 of obtaining information comprises to obtain information about any of the following features, or any combination of the following features:

a measured signal level of a signal received over paths in the plurality of paths
  a measure of data packet losses over the paths in the plurality of paths
  a measure of the packet delays for packets received over the paths in the plurality of paths.

The obtained information makes it possible to determine whether a particular path or particular paths of the established paths are disconnected or about to be disconnected. The obtained information may then be compared with specified criteria that provides reliable indications that the path(s) are disconnected or about to be disconnected. According to one particular embodiment there is provided a method wherein the step S3 of determining whether a particular path is disconnected or about to be disconnected comprises to compare the obtained information about the particular path with a specified criterion providing indications that the path is disconnected or about to be disconnected. The specified criterion may for example be a threshold value that is compared with the obtained information. The threshold values may be set to correspond to certain tolerance values. For example, if the number of registered data packet losses exceeds a certain amount then it is determined that the path is disconnected or about to be disconnected. Equivalent threshold values for the signal levels and packet delays can also be used to determine whether the path(s) is/are disconnected or about to be disconnected.

An alternative embodiment of the proposed technology provides a method wherein the at least one substitution path is set up based on a first comparison with the obtained information and wherein the at least one substitution path is activated based on a second comparison with the obtained information.

In other words, the obtained information can provide indications that one or several of the initially established paths is about to be disconnected. This may initiate a setup of a substitution path. After that the obtained information may be probed further to determine whether the substitution path should also be activated. Hence several comparisons could be made to ensure that a substitution path is timely set up as well as timely activated. This could, according to a particular example of the proposed technology, be obtained by means of a method wherein the at least one substitution path is set up based on a comparison of the obtained information with a first threshold providing indication that the at least one substitution path should be set up and wherein the at least one substitution path is activated based on a comparison of the obtained information with a second threshold providing indication that the at least one substitution path should be activated.

In other words, setting up the substitution path may be determined if a comparison between the obtained information and a first threshold provides reasons for doing so while the set up substitution path will get activated if a comparison between the obtained information and a second threshold provides reasons for activating the substitution path.

Other considerations can also be used to ensure a timely set up and activation of the substitution path. For example altering the time to trigger, TTT, the substitution path, where the action of setting up the substitution path or starting using the substitution path is not performed unless the determining criteria, such as a comparison with threshold values, has been met for the duration of the defined TTT.

It should be noted that the information that is obtained and used may in all embodiments of the method be represented by filtered values, such as time averaged values, to accommodate some random fluctuations/variations in order to reduce unnecessary set ups and activations of substitution paths.

Having described various embodiments of the proposed technology, in what follows there will be provided particular examples of the method as used in connection with MPTCP. The examples are merely provided to enhance the understanding of the proposed technology and should not be seen as limiting.

Figure 3:
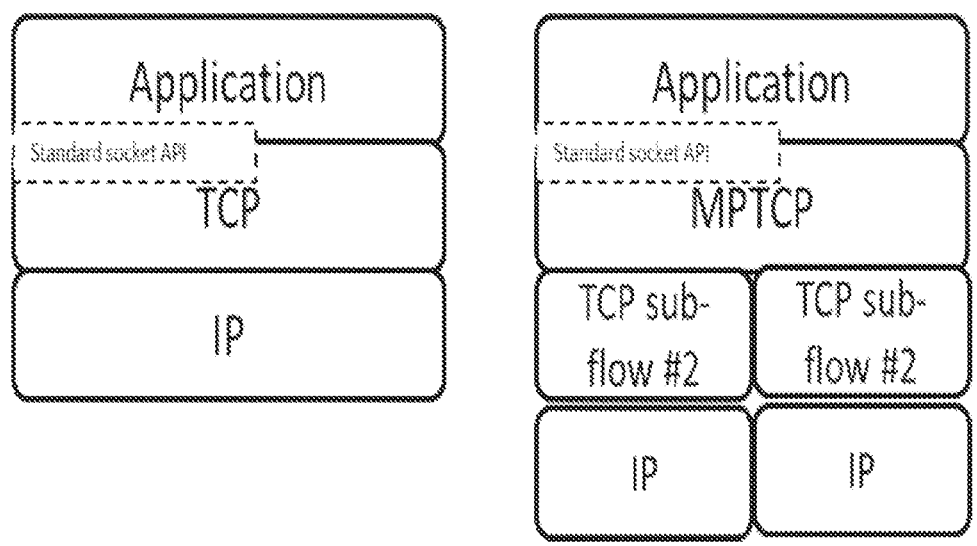
FIG. 3 is a schematic illustration showing the differences between TCP and MPTCP protocol stacks

Before more concrete examples are given it may be fruitful to give some background regarding the general workings of MPTCP. FIG. 3 provides a schematic illustration showing the differences between a regular TCP protocol stack and an MPTPC protocol stack. The application interface, i.e. the socket Application Programming Interface, socket API, is unchanged and the main changes are between this API and the IP-layer.

Figure 4A:
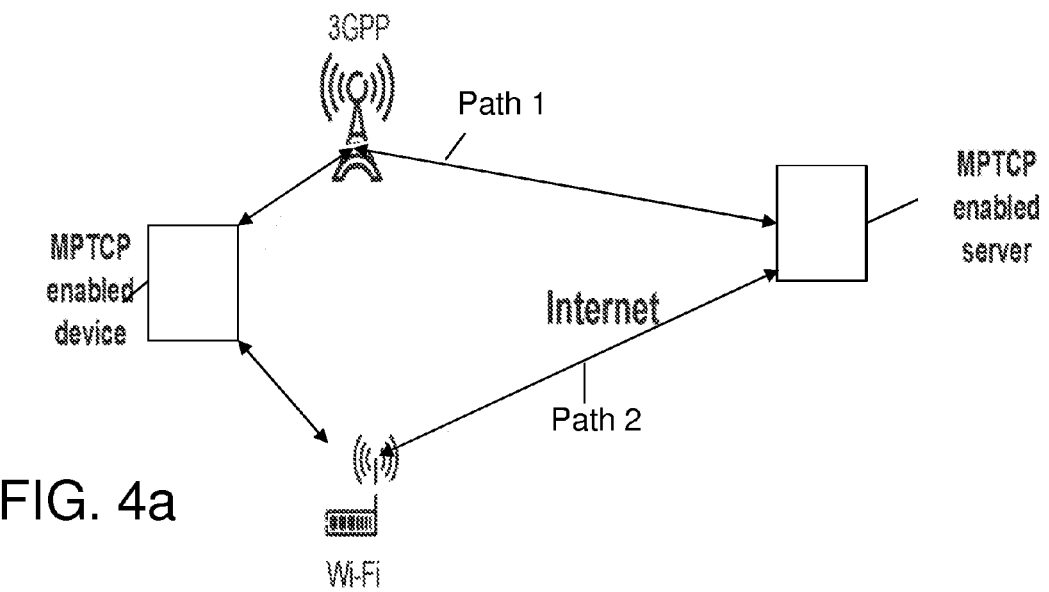
FIG. 4a is a schematic illustration of multi path connections between two MPTCP enabled network nodes in the form of a MPTCP enable device and an MPTCP enabled server.
Figure 4B:
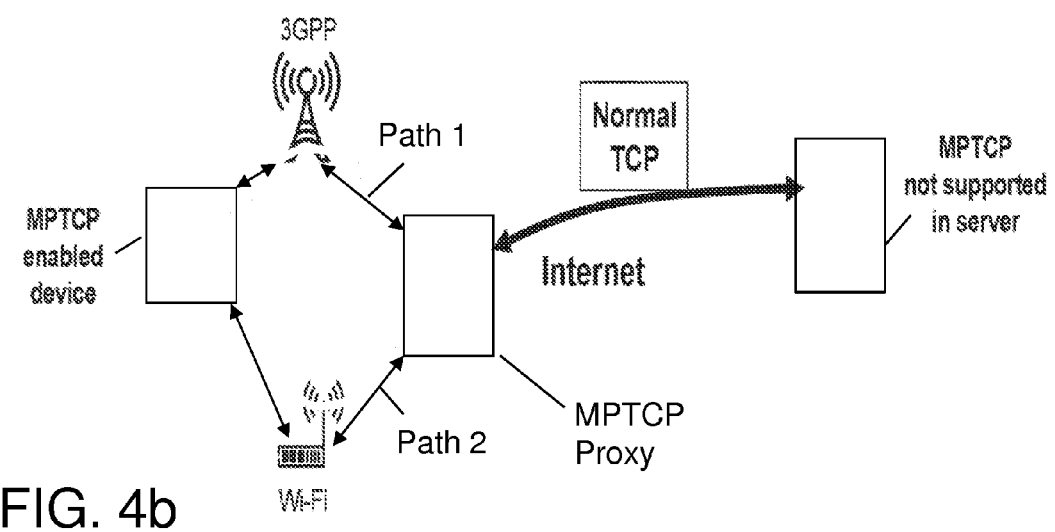
FIG. 4b is a schematic illustration of multi path connections between two network nodes by means of an MPTCP proxy for the case where one of the network nodes is not MPTCP enabled.

FIG. 4a and FIG. 4b show the two main deployment options for MPTCP. FIG. 4a shows the case when both the mobile client device and the Internet server support MPTCP. In this case MPTCP is used all the way and the different TCP paths carrying subflows are also all the way between the client and the server. FIG. 4b then shows the case when only the mobile client device supports MPTCP and where the Internet server does not support MPTCP. In this case an MPTCP-proxy can be introduced so that the benefits of MPTCP can be gained over the wireless links. The MPTCP proxy then communicates using normal TCP towards the Internet server.

Figure 5:
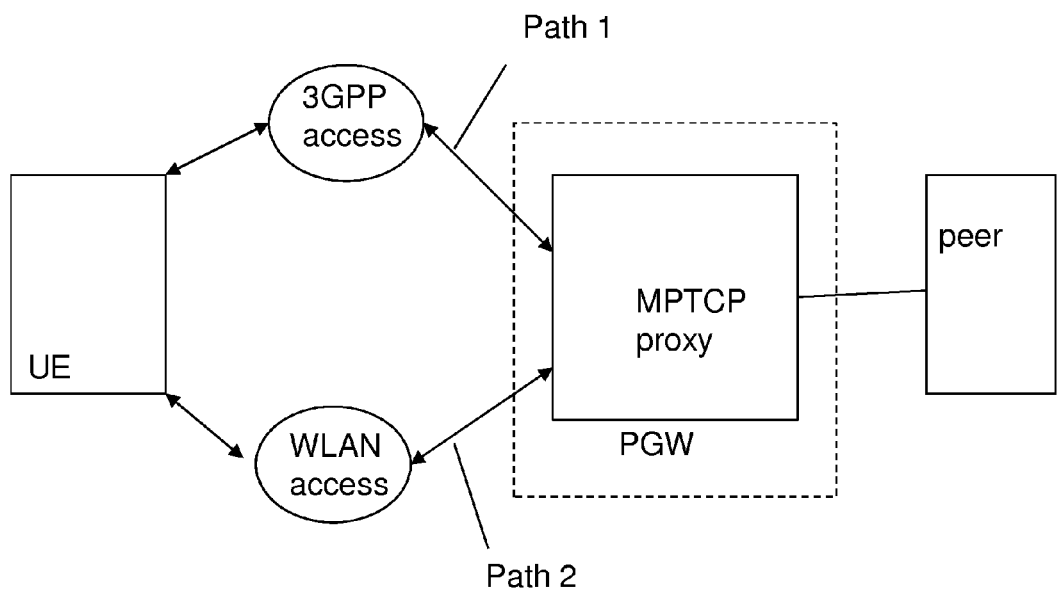
FIG. 5 is a schematic illustration of the use of an MPTCP proxy in a mobile network

FIG. 5 further shows an example of the case when an MPTCP-proxy is located in the PDN-GW in the mobile network.

Figure 6A:
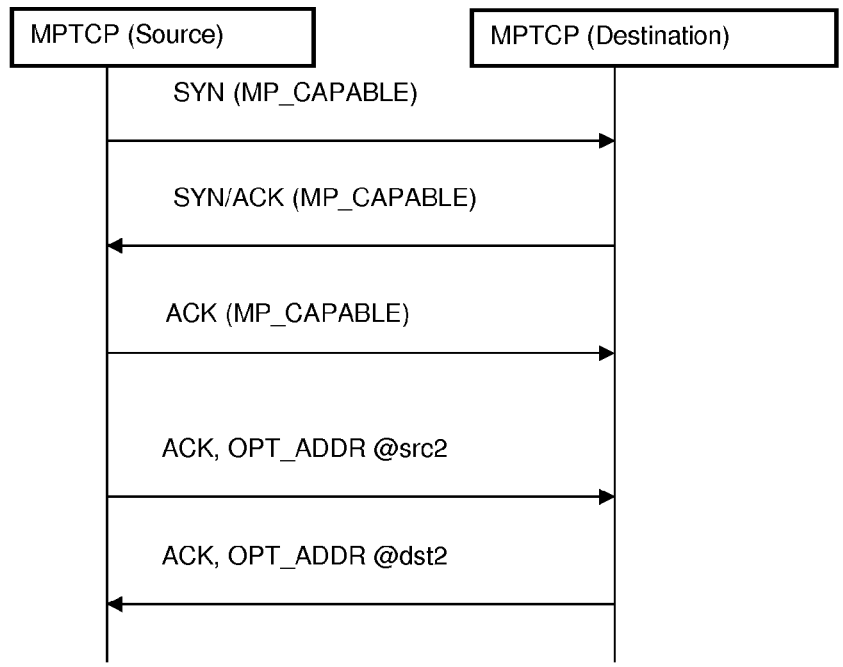
FIG. 6a is a signaling diagram illustrating the establishment of an MPTCP connection.

The MPTCP connection establishment process is illustrated in FIG. 6a. Like in standard TCP the connection establishment starts with the sending of a synchronization message, SYN, towards the destination, but this time it also includes the MP_CAPABLE TCP option which tells to the destination that the source supports MPTCP and wants to utilize it on this connection. If the destination also supports MPTCP, it replies with a SYN/ACK that also includes the MP_CAPABLE option. Along with the MP_CAPABLE option, the peers also communicate keys that they use to identify this particular MPTCP connection. These keys will be used later on when subflows are added to the MPTCP connection. The source then sends an ACK to finalize the connection setup. In this ACK the source also includes the MP_CAPABLE option, its MPTCP key and also the key received from the destination.

After that the source and destination can exchange additional source and destination addresses to be used, respectively. Note that the exchange of additional addresses can be performed any time after the connection establishment is performed, even after data has started flowing in the different paths, or equivalently, in different subflows. Addresses can also be removed later on, for example during handover from one network to another, the source address can then be removed after the handover to ensure that data is being sent over an active link only.

In the examples described below paths and subflows are used interchangeably, their relation being that particular subflows of data packets are performed over particular paths in the established connection. That is, an individual path can in this context be seen as a sequence of links between a sender and a receiver, defined by, for example, source and destination address/port pairs. A subflow can in this particular context be seen as a flow of TCP segments operating over an individual path, which forms part of a larger MPTCP connection. A subflow is started and terminated similar to a regular TCP connection. As an example one may consider the case where two network nodes communicate over a multi-path connection. The multi path connection could for example be a connection over two paths, in this case a first subflow occurs over the first path in the multi path connection, while the second subflow is over the second path in the multi path connection. The substitution path according to the proposed technology provides a new path in the multi path connection that can be used to inject data packets and thus creating a new subflow.

Figure 6B:
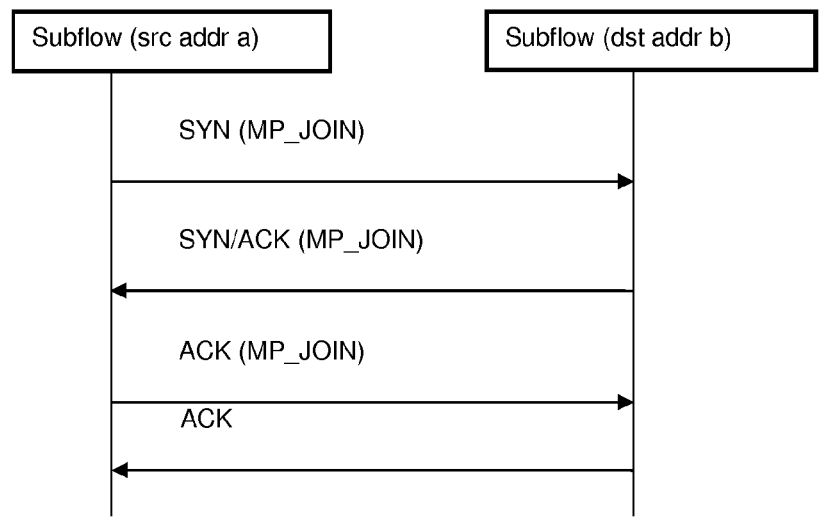
FIG. 6b is a signaling diagram illustrating how a subflow is initiated in a MPTCP connection.

FIG. 6a provides a schematic illustration of an MPTCP connection establishment. The connection established will provide the first subflow of the MPTCP connection. Additional paths carrying further subflows can be added later on to the MPTCP connection as illustrated in FIG. 6b. A SYN message with the MP_JOIN option is sent from a source address to a destination address. In this message, the token that the source has received from the destination during MPTCP establishment, as well as random number is included. The destination responds with a SYN/ACK message that also includes the MP_JOIN flag as well as a Hash-based Message Authentication Code key, HMAC key, that is computed based on the tokens that identify the MPTCP connection, the random number received from the source and a random number generated by the destination.

This random number is also included in the message. The source then sends an ACK back to the destination, with an HMAC that is also computed from the MPTCP tokens and the two random numbers. Though the inputs to the HMAC generation are the same at both nodes, the inputs are fed to the HMAC generation algorithm differently to generate two different HMACs. If the destination gets the expected HMAC, then it responds with an ACK and the subflow addition is complete. After this, some of the application data can be routed via the sub flow just created.

FIG. 6b shows schematically a MPTCP sub flow initiation. The needed extensions to TCP are described in ref. [1], RFC 6824 ("TCP Extensions for Multipath Operation with Multiple Addresses"). All MPTCP operations are signaled using optional TCP header fields. The generic MPTCP option format is shown in FIG. 7a.

Figure 7A:
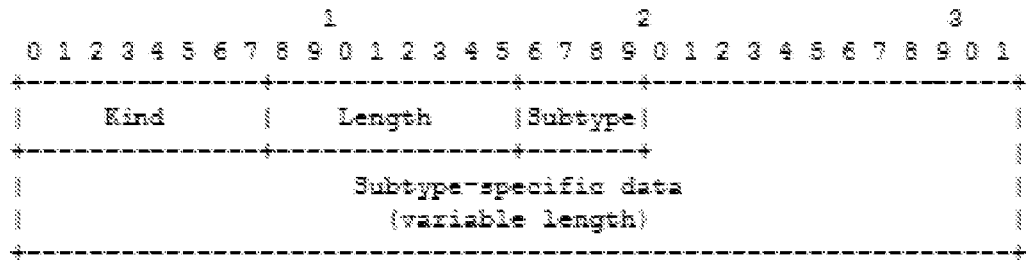
FIG. 7a is a schematic illustration of a generic MPTCP option format.

FIG. 7a provides a schematic illustration of a MPTCP option format. During the setup of additional subflows, it is possible to set a flag denoted "B" in the MP_JOIN option to configure, the subflow as a backup path. If the flag is set to B=1, the MPTCP will only send data on that subflow if there are no available subflows with the flag set to B=0. During the operation, the value of the "B" flag can be changed on a subflow by sending a MP_PRIO option.

This operation of MPTCP for data transfer or data routing will now be described. At a high level, an MPTCP implementation will take one input data stream from an application, and split it into one or more subflows, with sufficient control information to allow it to be reassembled and delivered reliably and in-order to the recipient application. The Data Sequence Mapping and the Data ACK are signaled in the Data Sequence Signal, DSS, option shown in FIG. 7b. Either or both can be signaled in one DSS, dependent on the flags set. The Data Sequence Mapping defines how the sequence space on the subflow maps to the connection level, and the Data ACK acknowledges receipt of data at the connection level.

Figure 7B:
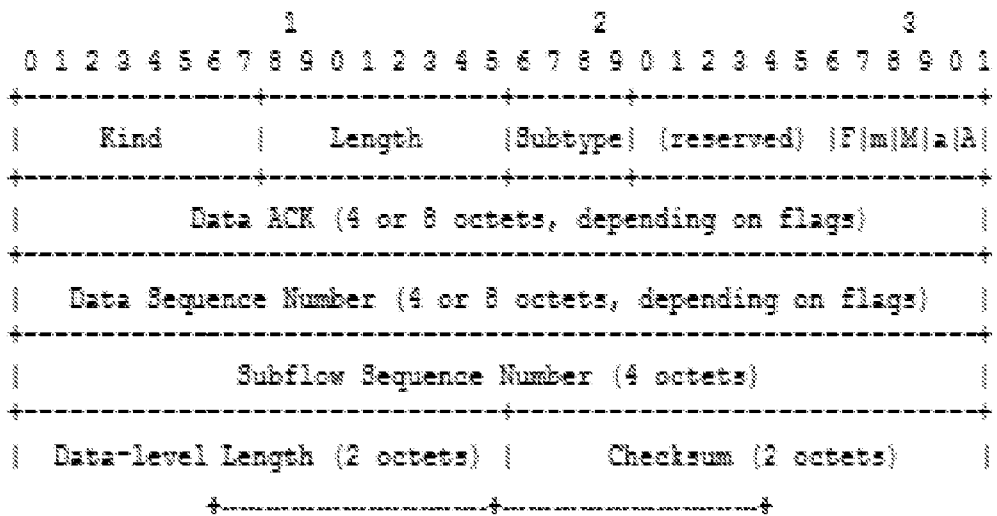
FIG. 7b is a schematic illustration of a data sequence signal, DSS, option.

FIG. 7b provides a schematic illustration of the Data Sequence Signal option, DSS option. The Data Sequence Number, DSN, specifies the starting sequence number for the connection level which is used by the receiver to ensure in-order delivery to the application layer. The DSN is specified as an absolute value, whereas the subflow sequence numbering is relative, that is, the SYN at the start of the subflow has relative subflow sequence number 0.

The Data ACK field indicates how much data has been successfully received, that is with no holes, at the data level and acts as a cumulative ACK for the MPTCP connection as a whole. This is analogous to the behavior of the standard TCP cumulative ACK. This is in comparison to the subflow-level ACK which acts analogous to TCP SACK, given that there may still be holes in the data stream at the connection level. The Data ACK specifies the next data sequence number it expects to receive.

A possible scenario for which MPTCP is suitable relates to the case when at least one of the client or server is associated with multiple interfaces and IP addresses making it possible to route the data through different paths in the network using these different IP addresses. The MPTCP specification however also supports the case when the same IP address is used at both ends since the separation of sub-flows can be performed using different TCP ports, i.e. the ports are used as address identifiers.

Having described the technology of MPTCP in general terms below follows some particular example of how the proposed technology may be utilized for MPTCP. These examples are merely illustrative and should not be construed as limiting.

A particular example relates to the enhancement of MPTCP by enabling the use of a new path along any of the operational RATs in the case where one path gets disconnected. A path can get disconnected for many reasons, e.g.:
The UE goes out of radio coverage from the specific RAT/cell/frequency utilized by that specific path of the MPTCP.
Overload/congestion conditions on the specific path leads to large delay between packet transmission and reception, or may even cause packets to be dropped due to buffer overflows In an exemplary embodiment illustrated in FIG. 8 a network node in the form a User Equipment, UE, has an active MPTCP connection over at least two different accesses towards a server. MPTCP subflows over these accesses are used in traffic aggregation mode. In the example described two accesses are used for traffic aggregation and one subflow is over 3GPP while another one is over WLAN. When the WLAN path is disconnected, the server sets up a new subflow over the 3GPP access by means of a substitution path and injects the outstanding packets of the disconnected WLAN path/subflow in the new subflow over 3GPP access. This results in two different subflows over 3GPP access. This is illustrated in FIG. 8 via a flowchart.

Figure 8:
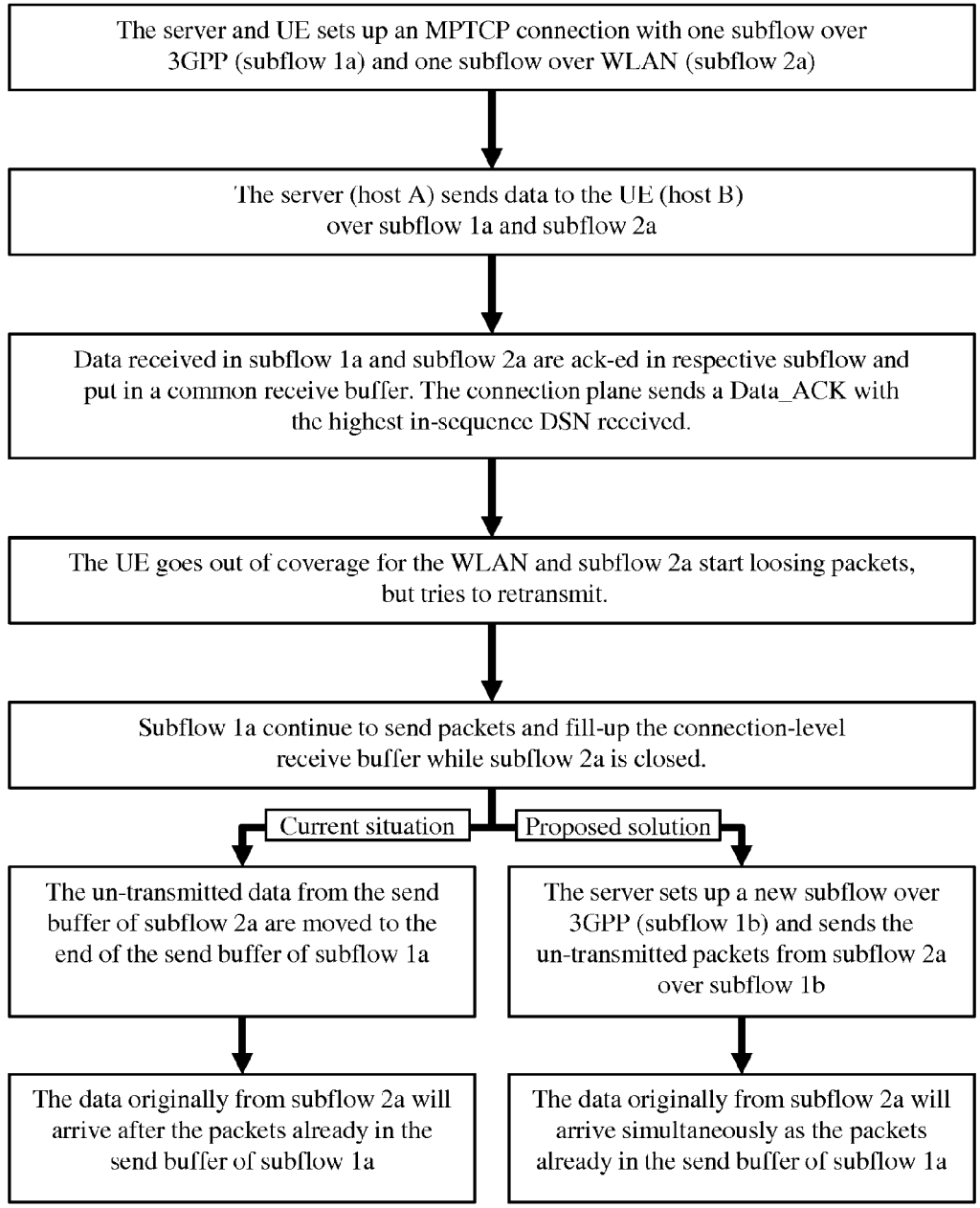
FIG. 8 is a detailed flow diagram illustrating a particular example of an embodiment of the proposed technology.

The newly activated subflow 1b, mentioned in relation to FIG. 8, could either be carried by:
A substitution path which was also established when setting up the initial MPTCP connection, that is, it was set up in addition to initial paths carrying subflows 1a and 2a, but was configured as a substitution path with flag B=1. In this case, the substitution path carrying the subflow 1b is activated for example by signaling change of this B-bit to B=0.
A substitution path which was also established when setting up the MPTCP connection (i.e. in addition to paths carrying subflows 1a and 2a), but is not being used to send any data.
A substitution path which was not initially established, but was known to both hosts through a previous exchange of the ADD_ADDR Option between the hosts. In another variant the server uses the same IP-address as was used for the subflow 1a.
If the addresses for the substitution path for the new subflow are not known to both hosts prior to losing the connection of a transmitting path, the new addresses can be communicated with an ADD_ADDR Option before data can be transmitted over a new path, that is, a substitution path.
Once all the dropped packets have been resent, received and acknowledged on the new substitution path and the sequencing of the packets in the connection level are restored, there are different possibilities:
The substitution path carrying subflow 1b may be closed or disconnected.
In another exemplary embodiment, the substitution path carrying subflow 1b is may be maintained and continued to be used as a parallel path in the MPTCP.
In still another exemplary embodiment, the substitution path carrying subflow 1b may be signaled to become a new substitution path, for example by signaling change of this B-bit to B=1.

The newly opened substitution path carrying subflow 1b mentioned with reference to FIG. 8, may also, in an exemplary embodiment, be set up by the UE towards the server, the opposite direction of the one shown in FIG. 8.

It is possible that the network side of the MPTCP connection is a MPTCP-enabled server or an MPTCP-proxy.

Figure 9:
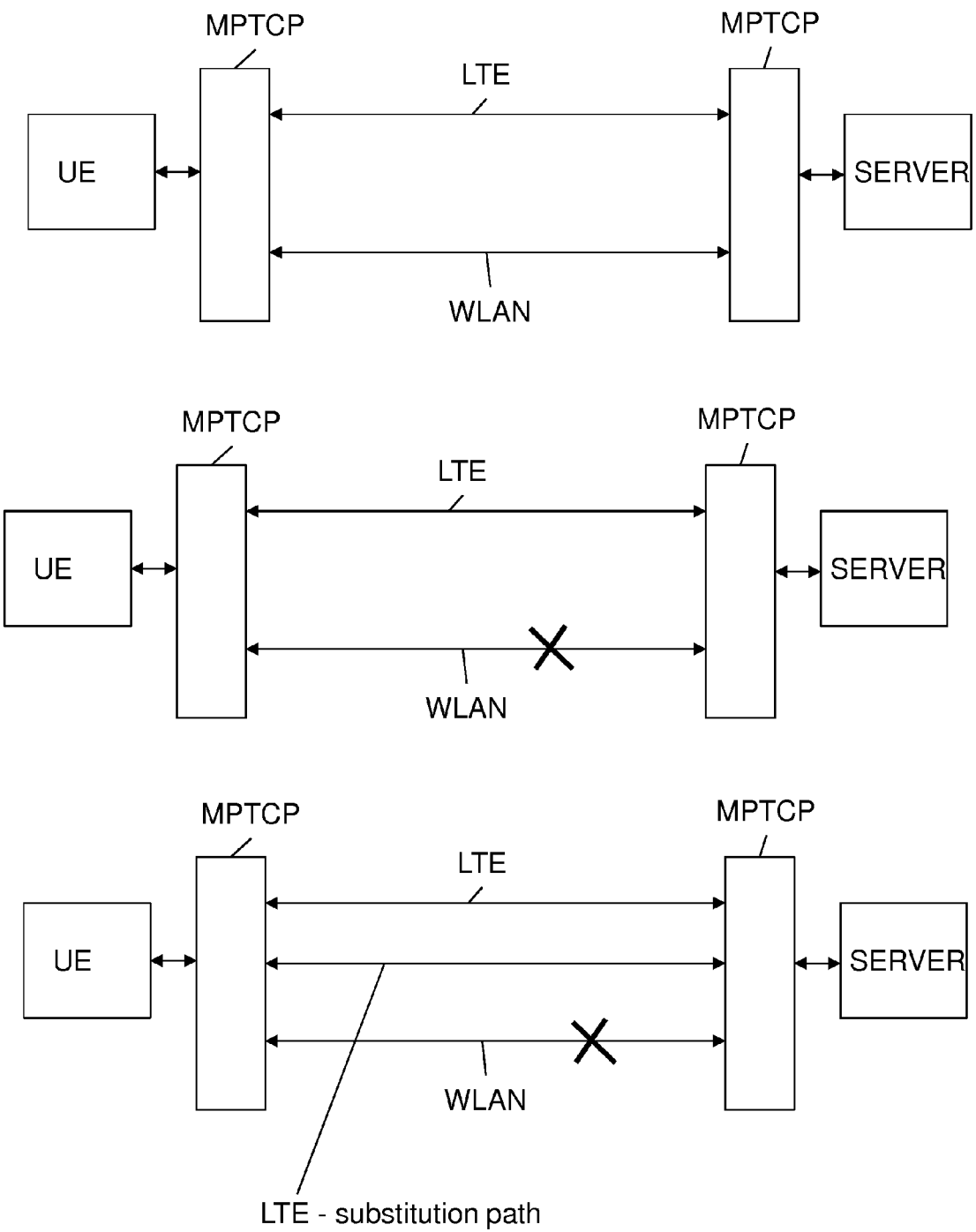
FIG. 9 is a schematic illustration of an exemplary embodiment showing how to use a substitution path according to the proposed technology when a particular path has been disconnected.

Some of the embodiments of the proposed technology relates to scenarios where a substitution path carrying a subflow over LTE is set up and activated when the connection over WLAN is lost. FIG. 9 illustrates how a network node in the form of a UE initially communicates with a target network node in the form of a server over an MPTCP connection comprising one path over LTE and one path over WLAN. In FIG. 9, the WLAN path gets disconnected and is replaced by a substitution path over LTE. The proposed technology is however equally applicable when substitution paths are configured over WLAN when a path over LTE is disconnected or over another non-3GPP path for when either LTE or WLAN paths gets disconnected.

MPTCP can be realized even if the physical path is the same and the client and server have only one IP address, as long as a different TCP port number is employed. Thus for the case above, when the substitution path is established via the 3GPP link, a different TCP port number can be used as compared to the other flow over the 3GPP link. It may be the case that the new path is physically realized via a link using the same frequency/cell as the other 3GPP link, e.g. using a time division duplex manner, or using a different frequency from the same cell serving the other 3GPP link, or even using a different cell/node than the one serving the other 3GPP link, e.g. dual connectivity via a secondary cell, if there is another cell available for the UE to connect to.

The proposed technology also provides a network node configured to perform the method. In other words, there is provided a network node 10 configured to handle multi path routing of data, wherein the network node 10 is configured to establish a multi path connection with a target network node 20, the multi path connection comprising a plurality of paths over which data packets are transmitted to the target network node 20.

The network node 10 is also configured to obtain information relating to the quality of the plurality of paths. The network node 10 is further configured to determine, based on the obtained information, whether a path in the plurality of paths has been disconnected or is about to be disconnected and the network node 10 is configured to activate the substitution path if it is determined that a path in the plurality of paths have been disconnected or is about to be disconnected to enable data packets intended to be transmitted on the disconnected path to be transmitted on the substitution path.

In an exemplary embodiment of the proposed technology the network node 10 is configured to perform the multi path routing by means of a Multiple Path Transmission Control Protocol, MPTCP.

According to another possible embodiment there is provided a network node 10 where the network node 10 is configured to establish an MPTCP connection where the plurality of paths comprises two paths.

According to yet another embodiment there is provided a network node 10 wherein the network node 10 is configured to establish the first path over a first Radio Access Technology and the second path over a second Radio Access Technology.

Still another embodiment provides a network node 10 wherein the first Radio Access Technology is a 3 GPP network and the second Radio Access Technology is a non-3GPP network.

The proposed technology also provides an embodiment of a network node 10 wherein the second Radio Access Technology comprises a Wireless Local Area Network, WLAN.

By way of example, the proposed technology also provides an embodiment of a network node 10, wherein the network node 10 is configured to set up the at least one substitution path together with the establishing of the multi path connection with the target network node 20.

In a particular example the network node 10 is configured to set up the at least one substitution path when it has been determined that a path in the plurality of paths has been disconnected or is about to be disconnected.

The network node is, in still another example, further configured to set up substitution paths over all Radio Access Technologies utilized in the established multi path connection A particular embodiment of a network node comprises a network node 10 that is configured to activate a substitution path over a Radio Access Technology that is different from the Radio Access Technology of the path determined to be disconnected or about to be disconnected.

A particular example of embodiment provides a network node 10 wherein the network node 10 is configured to activate a substitution path over a Radio Access Technology that is the same as the Radio Access Technology of the path determined to be disconnected or about to be disconnected but on a different frequency than the frequency of the path determined to be disconnected or about to be disconnected According to an optional embodiment there is provided a network node 10 where the network node 10 is configured to obtain information comprising any of the following features, or any combination of the following features:
  a measured signal level of a signal received over paths in the plurality of paths;
  a measure of data packet losses over the paths in the plurality of paths;
  a measure of the packet delays for packets received over the paths in the plurality of paths.

A particular embodiment of a network node 10 provides a network node 10 that is configured to determine whether a particular path is disconnected or about to be disconnected by comparing the obtained information about the particular path with a specified criterion providing indications that the path is disconnected or about to be disconnected.

Yet another embodiment of a network node 10 provides a network node 10 that is also configured to set up the at least one substitution path based on a first comparison with the obtained information and configured to activate the at least one substitution path based on a second comparison with the obtained information.

This embodiment could in a particular example provide a network node 10 that is configured to set up the at least one substitution path based on a comparison of the obtained information with a first threshold providing indication that the at least one substitution path should be set up and configured to activate the at least one substitution path based on a comparison of the obtained information with a second threshold providing indication that the at least one substitution path should be activated.

Figure 10:
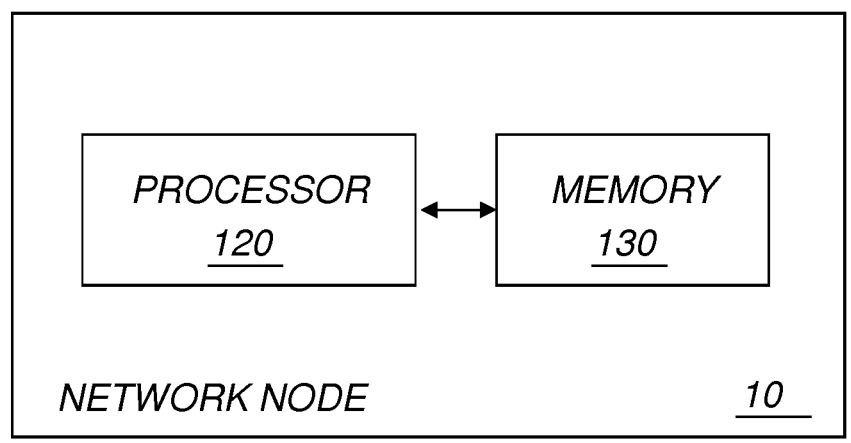
FIG. 10 is a block diagram illustrating an embodiment of a network node according to the proposed technology.

There is further provided a network node 10 according to the described embodiments wherein the network node 10 comprises a processor and a memory, the memory comprising instructions executable by the processor, whereby the processor is operative to handle a MPTCP connection. FIG. 10 is a schematic block diagram illustrating an example of a network node comprising a processor 120 and an associated memory 130.

In this particular example, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

Figure 11:
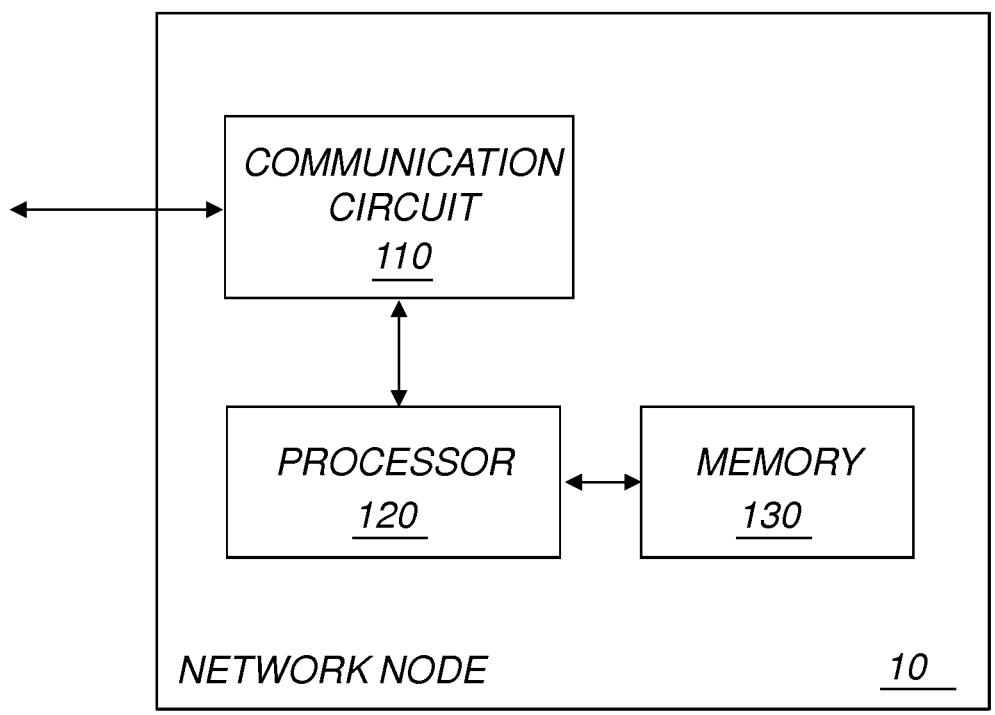
FIG. 11 is a block diagram illustrating an alternative embodiment of a network node according to the proposed technology.

Optionally the network node may also include communication circuitry. The communication circuitry may include functions for wired and/or wireless communication with other devices and/or network nodes in the network. In a particular example, the wireless device, UE, network node may include radio circuitry for communication with one or more other nodes, including transmitting and/or receiving information. The communication circuitry may be interconnected to the processor and/or memory. It is therefore also provided a network node 10 according to the described embodiments wherein the network node 10 also comprises communication circuitry. FIG. 11 is a schematic block diagram illustrating an example of a network node 10 comprising a processor 120 and an associated memory 130 as well as a communication circuitry 110.

The proposed technology may be applied to a user terminal, which may be a wired or wireless device.

As used herein, the non-limiting terms "User Equipment" and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the term "wired device" may refer to any device configured or prepared for wired connection to a network. In particular, the wired device may be at least some of the above devices, with or without radio communication capability, when configured for wired connection.

As used herein, the non-limiting term "network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

The term 'processor' as used should moreover be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

The proposed technology also provides a computer program 160. A particular embodiment of such a computer program provides a computer program comprising instructions, which when executed by at least one processor, cause the processor(s) to:
  read information relating to the quality of a plurality of paths comprised in a multi path connection;
  determine, based on the information, whether a path in the plurality of paths has been disconnected or is about to be disconnected;
  output instructions that at least one substitution path should be activated if it is determined that a path in the plurality of paths have been disconnected or is about to be disconnected, to thereby enable transmission of data packets intended to be transmitted on the disconnected path, or the path about to be disconnected, over the activated substitution path The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

Figure 12:
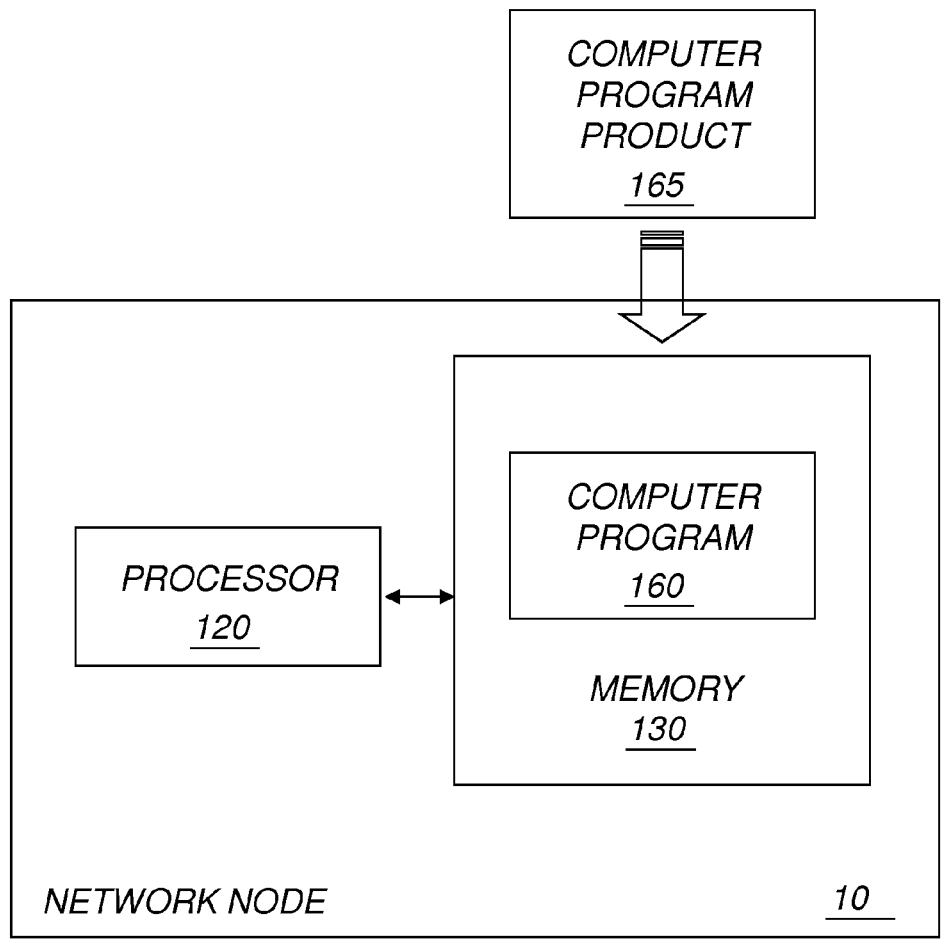
FIG. 12 is a block diagram illustrating an alternative embodiment of a network node according to the proposed technology when a computer program and a computer program product according to the proposed technology are used.

By way of example, the software or computer program may be realized as a computer program product 165, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof. FIG. 12 provides an illustration of how a computer program product 165 comprising a computer program 160 may be used in a network node 10 according to the proposed technology.

The flow diagram or diagrams presented herein may therefore be regarded as a computer flow diagram or diagrams, when performed by one or more processors. A corresponding network node may be defined as a group of function modules, where each step performed by the processor corresponds to a function module. In this case, the function modules are implemented as a computer program running on the processor. Hence, the network node may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 13.

Figure 13:
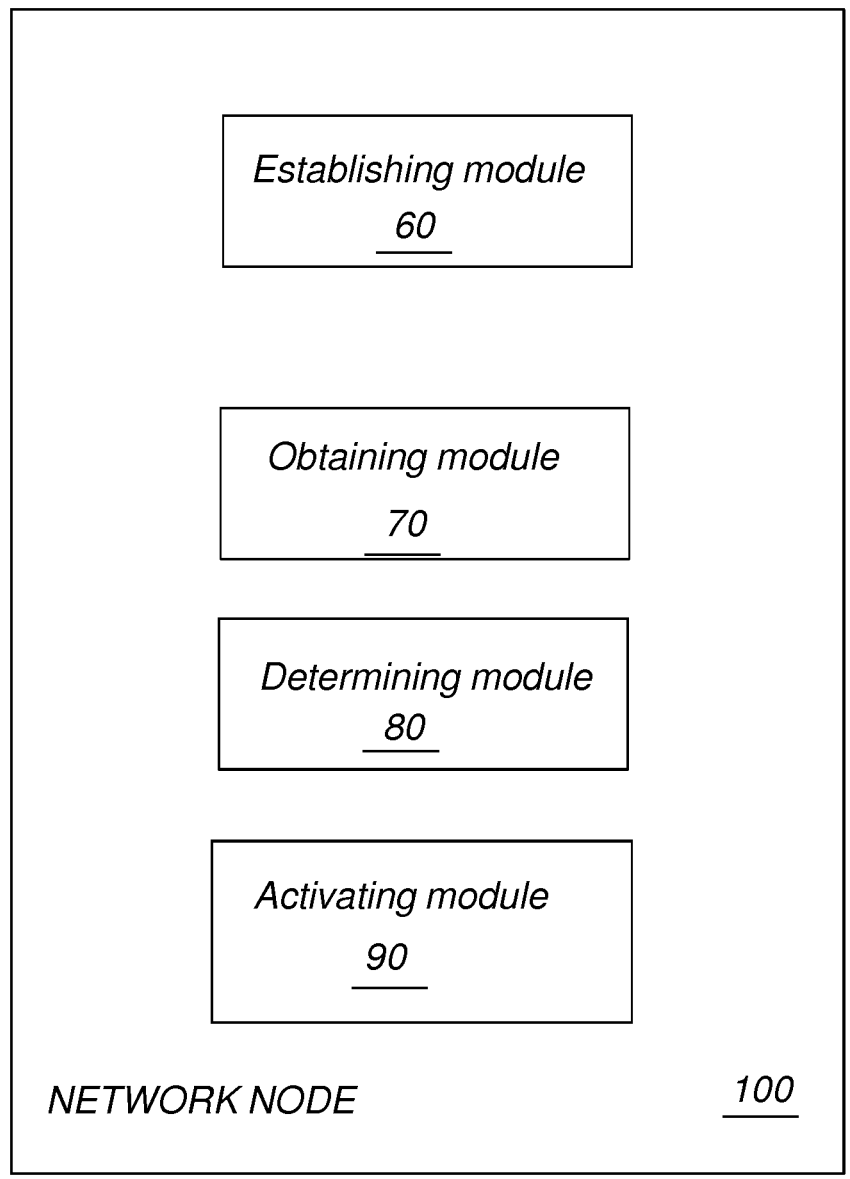
FIG. 13 is a block diagram illustrating an embodiment of a network node according to the proposed technology.

FIG. 13 is a schematic block diagram illustrating an example of a network node 100 for handling multi path routing of data packets, the network node 100 comprises:
an establishing module 60 for establishing a multi path connection with a target network node, the multi path connection comprising a plurality of paths over which data packets can be transmitted to the target network node;
an obtaining module 70 for obtaining information relating to the quality of the plurality of paths;
a determining module 80, for determining, based on the obtained information, whether a path in the plurality of paths has been disconnected or is about to be disconnected;
an activating module 90 for activating at least one substitution path if it is determined that a path in the plurality of paths have been disconnected or is about to be disconnected, to enable transmission of data packets intended to be transmitted on the disconnected path, or the path about to be disconnected, over the activated substitution path.

Alternatively it is possibly to realize the modules in FIG. 13 predominantly by hardware modules, or alternatively by hardware. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] RFC 6824—"TCP Extensions for Multipath Operation with Multiple Addresses", Ford et al; Published January 2013.

The invention claimed is:

1. A method performed by a network node for handling multi path routing of data packets, the method comprises:
establishing a multi path connection with a target network node, the multi path connection comprising a plurality of paths over which data packets can be transmitted to the target network node;
obtaining information relating to the quality of the plurality of paths;
determining, based on the obtained information, whether a path in the plurality of paths has been disconnected or is about to be disconnected; and
activating at least one substitution path for use in the multi path connection, if it is determined that a path in the plurality of paths has been disconnected or is about to be disconnected, to enable transmission of data packets intended to be transmitted on the path determined to be disconnected or about to be disconnected over the at least one substitution path;
wherein the at least one substitution path is set up based on a first comparison with the obtained information and wherein the at least one substitution path is activated based on a second comparison with the obtained information, said second comparison being used for determining whether a path in the plurality of paths has been or is about to be disconnected.

2. The method of claim 1, wherein said multi path routing is performed by means of a Multiple Path Transmission Control Protocol, MPTCP.

3. The method according to claim 2, wherein the step of establishing the multi path connection comprises establishing an MPTCP connection, and wherein the plurality of paths comprising the MPTCP connection comprises a first path and a second path.

4. The method according to claim 3, wherein the first path is over a first Radio Access Technology and the second path is over a second Radio Access Technology.

5. The method according to claim 4, wherein the first Radio Access Technology is a 3GPP network and the second Radio Access Technology is a non-3GPP network.

6. The method according to claim 5, wherein the second Radio Access Technology comprises a Wireless Local Area Network, WLAN.

7. The method according to claim 1, wherein the at least one substitution path uses a Radio Access Technology that is different from the Radio Access Technology of the path determined to be disconnected or about to be disconnected.

8. The method according to claim 1, wherein the at least one substitution path uses a Radio Access Technology that is the same as the Radio Access Technology of the path determined to be disconnected or about to be disconnected but on a different frequency than the frequency of the path determined to be disconnected or about to be disconnected.

9. The method according to claim 1, wherein the step of obtaining information comprises obtaining information about any of the following features, or any combination of the following features:
a measured signal level of a signal received over the paths in the plurality of paths;
a measure of data packet losses over the paths in the plurality of paths; and a measure of the packet delays for packets received over the paths in the plurality of paths.

10. A method performed by a network node for handling multi path routing of data packets, the method comprises:
establishing a multi path connection with a target network node, the multi path connection comprising a plurality of paths over which data packets can be transmitted to the target network node;
obtaining information relating to the quality of the plurality of paths;
determining, based on the obtained information, whether a path in the plurality of paths has been disconnected or is about to be disconnected; and
activating at least one substitution path for use in the multi path connection, if it is determined that a path in the plurality of paths has been disconnected or is about to be disconnected, to enable transmission of data packets intended to be transmitted on the path determined to be disconnected or about to be disconnected over the at least one substitution path;
wherein the method further comprises setting up the at least one substitution path in dependence on comparing the obtained information relating to the quality of the plurality of paths with a first threshold, and activating the at least one substitution path for use in the multi path connection comprises activating the at least one substitution path in dependence on comparing the obtained information relating to the quality of the plurality paths with a second threshold, wherein the second threshold is used for determining that a path in the plurality of paths has been disconnected or is about to be disconnected.

11. A network node configured to handle multi path routing of data, wherein the network node comprises:
communication circuitry; and
processing circuitry configured to:
establish, via the communication circuitry, a multi path connection with a target network node, the multi path connection comprising a plurality of paths over which data packets are transmitted to the target network node;
obtain information relating to the quality of the plurality of paths;
determine, based on the obtained information, whether a path in the plurality of paths has been disconnected or is about to be disconnected; and
activate at least one substitution path for use in the multi path connection, if it is determined that a path in the plurality of paths has been disconnected or is about to be disconnected, to enable data packets intended to be transmitted on the path determined to be disconnected or about to be disconnected, over the at least one substitution path;
wherein the processing circuitry is further configured to set up the at least one substitution path based on a first comparison with the obtained information and configured to activate the at least one substitution path based on a second comparison with the obtained information, said second comparison being used to determine whether a path in the plurality of paths has been or is about to be disconnected.

12. The network node according to claim 11, wherein the processing circuitry is configured to perform the multi path routing by means of a Multiple Path Transmission Control Protocol, MPTCP.

13. The network node according to claim 12, wherein the processing circuitry is configured to establish the multi path connection by establishing an MPTCP connection, where the plurality of paths comprising the MPTCP connection comprises a first path and a second path.

14. The network node according to claim 13, wherein the processing circuitry is configured to establish the first path over a first Radio Access Technology and the second path over a second Radio Access Technology.

15. The network node according to claim 14, wherein the first Radio Access Technology is a 3GPP network and the second Radio Access Technology is a non-3GPP network.

16. The network node according to claim 15, wherein the second Radio Access Technology comprises a Wireless Local Area Network, WLAN.

17. The network node according to claim 11, wherein the at least one substitution path uses a Radio Access Technology that is different from the Radio Access Technology of the path determined to be disconnected or about to be disconnected.

18. The network node according to claim 11, wherein the at least one substitution path uses a Radio Access Technology that is the same as the Radio Access Technology of the path determined to be disconnected or about to be disconnected but on a different frequency than the frequency of the path determined to be disconnected or about to be disconnected.

19. The network node according to claim 11, wherein the processing circuitry is configured to obtain, as said information relating to the quality of the plurality of paths, information comprising any of the following features, or any combination of the following features:
a measured signal level of a signal received over the paths in the plurality of paths;
a measure of data packet losses over the paths in the plurality of paths; and
a measure of the packet delays for packets received over the paths in the plurality of paths.

20. A network node configured to handle multi path routing of data, wherein the network node comprises:
communication circuitry; and
processing circuitry configured to:
establish, via the communication circuitry, a multi path connection with a target network node, the multi path connection comprising a plurality of paths over which data packets are transmitted to the target network node;
obtain information relating to the quality of the plurality of paths;
determine, based on the obtained information, whether a path in the plurality of paths has been disconnected or is about to be disconnected; and
activate at least one substitution path for use in the multi path connection, if it is determined that a path in the plurality of paths has been disconnected or is about to be disconnected, to enable data packets intended to be transmitted on the path determined to be disconnected or about to be disconnected, over the at least one substitution path;
wherein the processing circuitry is further configured to set up the at least one substitution path in dependence on comparing the obtained information relating to the quality of the plurality of paths with a first threshold, and to activate the at least one substitution path for use in the multi path connection in dependence on comparing the obtained information relating to the quality of the plurality of paths with a second threshold that is used for determining that a path has been disconnected or is about to be disconnected.

21. The network node according to claim 11, wherein the processing circuitry comprises a processor and a memory, said memory comprising instructions executable by the processor, whereby the processor is operative to handle a Multiple Path Transmission Control Protocol, MPTCP, connection.

\* \* \* \* \*